US007152589B2

(12) United States Patent
Ekeroth et al.

(10) Patent No.: US 7,152,589 B2
(45) Date of Patent: *Dec. 26, 2006

(54) METHOD AND A DEVICE FOR CLEANING OF CRANKCASE GAS

(75) Inventors: Mats Ekeroth, Landskrona (SE); Claes-Goran Carlsson, Tullinge (SE); Rolf Ridderstrale, Stockholm (SE); Jan Skoog, Skogas (SE); Goran Strom, Ronninge (SE); Claes Wase, Tullinge (SE)

(73) Assignee: Alfa Laval Corporate AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/518,734

(22) PCT Filed: Jun. 17, 2003

(86) PCT No.: PCT/SE03/01031

§ 371 (c)(1), (2), (4) Date: Jul. 18, 2005

(87) PCT Pub. No.: WO04/001200

PCT Pub. Date: Dec. 31, 2003

(65) Prior Publication Data

US 2006/0048761 A1    Mar. 9, 2006

(30) Foreign Application Priority Data

Jun. 20, 2002   (SE) .................................... 0201933

(51) Int. Cl.
*F01M 13/04* (2006.01)
*B04B 5/08* (2006.01)
*B04B 9/10* (2006.01)
*B01D 45/14* (2006.01)

(52) U.S. Cl. .................................................... 123/572

(58) Field of Classification Search ........ 123/572–574, 123/41.86; 96/397; 95/8, 12, 19–2, 20; 55/403–406, 400, 467
See application file for complete search history.

(56) References Cited

U.S. PATENT DOCUMENTS

| 3,234,716 | A | * | 2/1966 | Sevin et al. ............. 210/360.1 |
| 3,949,719 | A | * | 4/1976 | Bellanca et al. ............ 123/574 |
| 5,564,401 | A | * | 10/1996 | Dickson ..................... 123/573 |
| 5,954,035 | A |   | 9/1999 | Hofer et al. |

(Continued)

FOREIGN PATENT DOCUMENTS

JP           358106123 A  *  6/1983  ............... 123/41.31

(Continued)

*Primary Examiner*—Marguerite McMahon
(74) *Attorney, Agent, or Firm*—Michaud-Duffy Group LLP

(57) ABSTRACT

Upon cleaning of crankcase gas generated during operation of an internal combustion engine in its crankcase, a centrifugal separator is used, which includes a rotor arranged for rotation by means of a driving motor and arranged by its rotation suck crankcase gas from the crankcase through a conduit to the centrifugal separator. During operation of the combustion engine a parameter, e.g. a measurement of the load on the combustion engine is sensed, the magnitude of said parameter being related to the amount of crankcase gas generated per unit of time in the crankcase. Depending upon a sensed change of the sensed parameter the rotational speed of the rotor of the centrifugal separator is changed in a way such that the gas pressure in the crankcase is maintained at a predetermined value, or within a predetermined pressure interval, during the operation of the combustion engine.

11 Claims, 3 Drawing Sheets

U.S. PATENT DOCUMENTS 6,783,571 B1 * 8/2004 Ekeroth .......................... 95/8

FOREIGN PATENT DOCUMENTS

| | | | |
|---|---|---|---|
| JP | 363005108 A * | 1/1988 | ............ 123/41.02 |
| WO | WO 99/567883 | 11/1999 | |
| WO | WO 01/36103 A1 | 5/2001 | |

* cited by examiner

METHOD AND A DEVICE FOR CLEANING OF CRANKCASE GAS

CROSS-REFERENCE TO RELATED APPLICATIONS

This application is entitled to the benefit of and incorporates by reference essential subject matter disclosed in International Application No. PCT/SE2003/001031 filed on Jun. 17, 2003 and Swedish Patent Application No. 0201933.9 filed on Jun. 20, 2002.

FIELD OF THE INVENTION

The present invention relates to a method and a device for cleaning of crankcase gas that is generated during operation of an internal combustion engine in its crankcase. Internal combustion engines are used for different purposes, e.g. for propelling of transportation means on land, on sea or in the air, for performing mechanical work or in stationary or mobile plants for production of electric current.

BACKGROUND OF THE INVENTION

Cleaning of crankcase gas requires a cleaning device, which can effectively separate very small particles, solid and/or liquid, suspended in the crankcase gas. Different types of cleaning devices have been proposed, such as traditional filters, cyclones or different kinds of centrifugal separators having rotating members. Lately, centrifugal separators of a relatively advanced kind have been proposed for such cleaning, and different methods have been proposed for driving of centrifugal separators of these kinds. Thus, it has been suggested that a centrifugal separator for this purpose should be driven mechanically by means of one of the ordinary shafts of the combustion engine, e.g. the crank shaft or the cam shaft (see for instance U.S. Pat. No. 5,954,035). Another suggestion has been that a centrifugal separator should be driven by means of an electric motor (see for instance WO 01/36103). A further suggestion has been that a fluid, gas or liquid, should be pressurized by means of the combustion engine and be used for driving of a turbine of one kind or another, coupled to a centrifugal rotor for cleaning of crankcase gas (see for instance WO 99/56883).

Irrespective of the kind of device used for cleaning of crankcase gas that is produced by a combustion engine it is difficult to avoid that the operation of the cleaning device influences the crankcase gas pressure prevailing in the crankcase of the combustion engine. Either the cleaning device creates a counter pressure for the crankcase gas to be cleaned, which may lead to an undesired overpressure in the crankcase, or the cleaning device causes a certain underpressure in its inlet for crankcase gas to be cleaned, which may propagate to the crankcase of the combustion engine and created therein an undesired underpressure. In many cases there is a requirement that the pressure in the crankcase must be kept within a certain pressure interval, i.e. it must not-rise above a certain first value and must not drop below a certain second value during the operation of the combustion engine.

The said problem may theoretically be solved for instance by means of pressure sensing control valves of different kinds. However, great demands are put on the pressure sensitivity of such valves, and these demands may be difficult to fulfil in the environment where the valves have to operate.

The object of the present invention is to provide a method and a device for cleaning of crankcase gas generated during operation of a combustion engine in its crankcase, by means of which a predetermined gas pressure, or a gas pressure within a predetermined pressure interval, is maintained in the crankcase of the combustion engine.

SUMMARY OF THE INVENTION

The present invention is directed in one aspect to the use of a centrifugal separator that includes a centrifugal rotor arranged for rotation by means of a driving motor and arranged by its rotation to suck crankcase gas from the crankcase to the centrifugal separator, sensing of a parameter, the magnitude of which is related to the amount of crankcase gas generated per unit of time in the crankcase, and changing the rotational speed of the centrifugal rotor in response to a sensed change of said parameter in a way so that the gas pressure in the crankcase is maintained at a predetermined value, or within a predetermined pressure interval, during the operation of the combustion engine. The change of the rotational speed of the centrifugal rotor may be accomplished stepwise or continuously.

By the invention it is possible to accomplish satisfactory cleaning of crankcase gas from the combustion engine even when the load thereon varies, while a desired gas pressure is maintained in the crankcase of the combustion engine. The invention is based on the understanding that a centrifugal separator that is used need not be operated with the same separation efficiency during the complete operating time of the combustion engine and that the cleaning efficiency and the suction efficiency of the centrifugal separator can be controlled by changing the rotational speed of the centrifugal rotor. Thus, when a relatively small amount of crankcase gas is generated per unit of time, efficient cleaning of the crankcase gas may be accomplished at a substantially lower rotational speed of the centrifugal rotor than is needed when a relatively large amount of crankcase gas is generated per unit of time.

By use of a centrifugal separator, the centrifugal rotor of which is arranged upon its rotation to suck crankcase gas from the crankcase, the need of an extra pump or fan for transportation of crankcase gas from the crankcase to and through the centrifugal separator is avoided.

Upon use of a combustion engine for propelling a vehicle a given relation often prevails between the speed, by which the vehicle is propelled, and the amount of crankcase gas being generated in the crankcase of the combustion engine. This need not always be the case, however, and it is usually not the case when a combustion engine is used for instance for production of electric current. Thus, the more crankcase gas generated in the crankcase the more load there is put on the combustion engine, independent of whether the combustion engine crank shaft is driven at an increased or at a substantially unchanged rotational speed. In connection with production of electric current, i.e. when the combustion engine is arranged for rotation of an electrical generator, the combustion engine may be kept in operation substantially at an unchanged rotational speed upon varying production of electric current. In this case the electrical generator is adjustable during operation in order to be able to generate, at a constant rotational speed of the combustion engine, different amounts of electric current according to a varying need of such current.

Sensing of a change of the amount of crankcase gas generated per unit of time in the crankcase of the combustion engine may be performed in different ways. For instance, the gas pressure in the crankcase or in a connection between this and the centrifugal separator may be sensed. Alternatively, the flow of crankcase gas in said connection can be sensed.

Alternatively, the said sensed parameter may be of a kind indicating the prevailing or an immediately approaching load on the combustion engine. In connection with production of electric current by means of an electric generator operated by the combustion engine, thus, after preparative empirical trials, control of the centrifugal rotor speed can be accomplished on the basis of continuous sensing of a varying need of electric current, that is satisfied by the electrical generator. On the basis of knowledge about how such a varying need influences the load on the combustion engine, and thereby the amount of crankcase gas produced per unit of time, the rotational speed of the centrifugal rotor may be adjusted in a suitable way. For instance, the effect delivered by the electrical generator may be sensed and caused to generate a control signal that varies with changes of this effect. The magnitude of the control signal can be regarded as a measurement of the load on the combustion engine driving the electrical generator and, thereby, representative for the amount of crankcase gas generated in the crankcase of the combustion engine. In a practical case a control signal may vary within the interval of 4-20 mA depending upon the load of the electrical generator on the engine, and the corresponding speed interval for the rotation of the centrifugal rotor may be such that the gas pressure in the crankcase of the combustion engine is kept within the pressure interval 0–4 mbar.

As mentioned initially a centrifugal rotor for cleaning of crankcase gas may be driven in many different way. The invention is applicable independent of which kind of device is chosen for driving of the centrifugal rotor. Advantageously, an electrical motor is used for the driving of the centrifugal rotor, and in a case like this a frequency converter is preferably used for changing of the rotational speed of the motor.

On a modern vehicle of the category large lorries and working machines there is normally a computer network installed. One previously known computer network of this kind is called CAN-bus (CAN=Controller Area Network). In this computer network, which preferably includes a vehicle computer and is coupled to many different sensors placed in different parts of the vehicle and in the combustion engine, there are a lot of data available concerning various functions and conditions prevailing on the vehicle. Examples of data, which may be available are:
- the present engine speed
- the present load on the engine
- the load on the engine as desired by the driver of the vehicle (present pressure on the accelerator pedal of the vehicle)
- the engine temperature
- the ambient air temperature
- the speed of the vehicle
- the total operational time of the engine since the engine was new
- the driving distance of the vehicle since the engine was new
- operational time since the engine was last started Of course, many other data are available in a network of this kind depending upon which components are present on the vehicle. By means of a vehicle computer connected with the network various data may be combined and converted into control signals of various kinds for controlling of various functions on board the vehicle, e.g. signals for controlling of the cleaning of crankcase gas according to the invention.

In a preferred embodiment of a device according to the invention its equipment for changing the rotational speed of the centrifugal separator may comprise a decoding- or selection device, that is adapted to receive or choose only certain ones of several data available in a source of information of this kind, said control equipment being adapted to be actuated by such received or chosen data and, in turn, to change the rotational speed of the electrical motor in dependence thereof. Irrespective of whether a computer network of the aforementioned kind is available or not the cleaning device in an advantageous embodiment of the invention is preferably connectable to a sensor that is arranged to sense an actual change of the amount of crankcase gas being produced by the combustion engine.

The invention is described more closely in the following with reference to the accompanying drawing, in which FIG. 1 shows an example of an electrical motor driven centrifugal separator of the kind that can be included in a device according to the invention, FIG. 2 is a sectional view taken along the line II—II in FIG. 1, FIG. 3 illustrates schematically a vehicle equipped with a device according to the invention and FIG. 4 shows schematically a plant for production of electric current, including among other things an internal combustion engine and a device according to the invention.

DETAILED DESCRIPTION OF THE PREFERRED EMBODIMENTS

Figure 1:
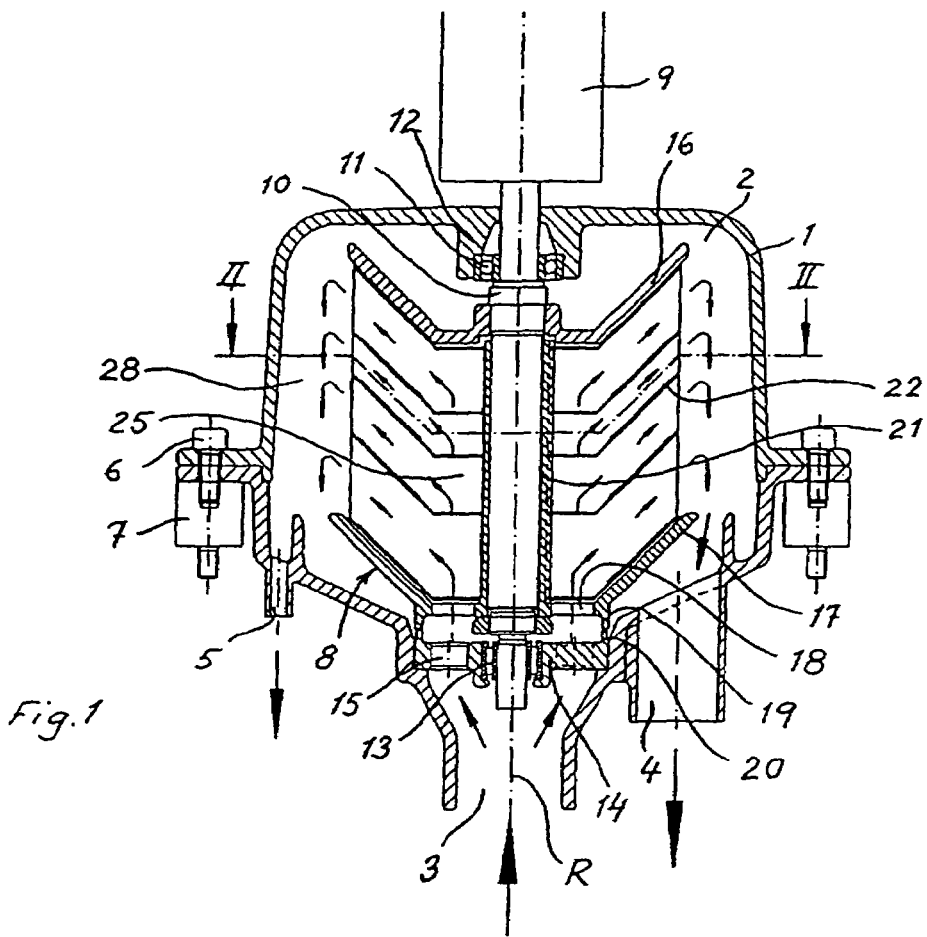
FIG. 1 shows a sectional view of a centrifugal separator that may be mounted on a vehicle and is intended for cleaning of crankcase gas from particles suspended therein, which have a larger density than the gas.

The centrifugal separator includes a housing 1 delimiting a chamber 2. The housing forms a gas inlet 3 to the chamber 2 for gas to be cleaned and a gas outlet 4 from the chamber 2 for clean gas. The housing further forms a particle outlet 5 from the chamber 2 for particles having been separated from the gas.

The housing 1 includes two parts which are kept together by means of a number of screws 6. These screws 6 are also adapted to fix the housing to suspension members 7 of some elastic material, through which the housing may be supported on said vehicle (not shown).

Within the chamber 2 a rotor 8 is arranged rotatable around a vertical rotational axis R. An electrical motor 9 is arranged for rotation of the rotor 8. The rotor 8 includes a vertically extending central spindle 10, which at its upper end is journalled in the housing 1 through a bearing 11 and a bearing carrier 12 and at its lower end is journalled in the housing I through a bearing 13 and a bearing carrier 14. The bearing carrier 14 is situated in the gas inlet 3 of the housing and is therefore provided with through holes 15 for incoming gas to be cleaned in the chamber 2.

The rotor 8 further includes an upper end wall 16 and a lower end wall 17, said two end walls being connected with the central spindle 10. The lower end wall 17 in a central portion is provided with through holes 18, so that the interior of the rotor may communicate with the gas inlet 3. Furthermore, the lower end wall 17 is provided with an annular flange 19 that is arranged to cooperate with a similar annular flange 20 of the bearing carrier 14, so that gas entering through the gas inlet 3 is conducted into the interior of the rotor 8 through the just mentioned holes 18. The flanges 19 and 20 may be arranged to seal completely against each other, but a complete sealing between them is not necessary.

The lower end wall 17 is shaped in one piece with a hollow column 21, which extends axially upwardly from the end wall 17 and closely surrounds the central spindle 10. The column extends all the way up to the upper end wall 16.

In the area of the column 21 the central spindle 10 is cylindrical, preferably for cost reason circular cylindrical, and the inside of the column 21 is formed in the same way as the outside of the spindle. The outside of the column 21 has a non-circular cross sectional shape, as can be seen from FIG. 2.

Between the end walls 16 and 17 there is arranged a stack of conical separation discs 22. Each one of these has one portion formed as a frustum of a cone and one plain portion 23 formed integrally therewith, closest to the column 21. As shown in FIG. 2, the plain portion is formed so that it may engage with the non-circular column 21 in a way such that the separation disc shall not be able to rotate relative to the column 21. Furthermore, the plain portion 23 is provided with several through holes 24. Independent of whether the holes 24 in the various separation discs 22 are axially aligned or not they form together with the interspaces between the central portions of the separation discs 22 a central inlet space 25 within the rotor (see FIG. 1), which communicates with the gas inlet 3.

For the sake of clarity the drawing shows only a few separations discs 22 having large axial interspaces. In practice, many more separation discs are to be arranged between the end walls 16 and 17, so that relatively thin interspaces are formed there between.

Figure 2:
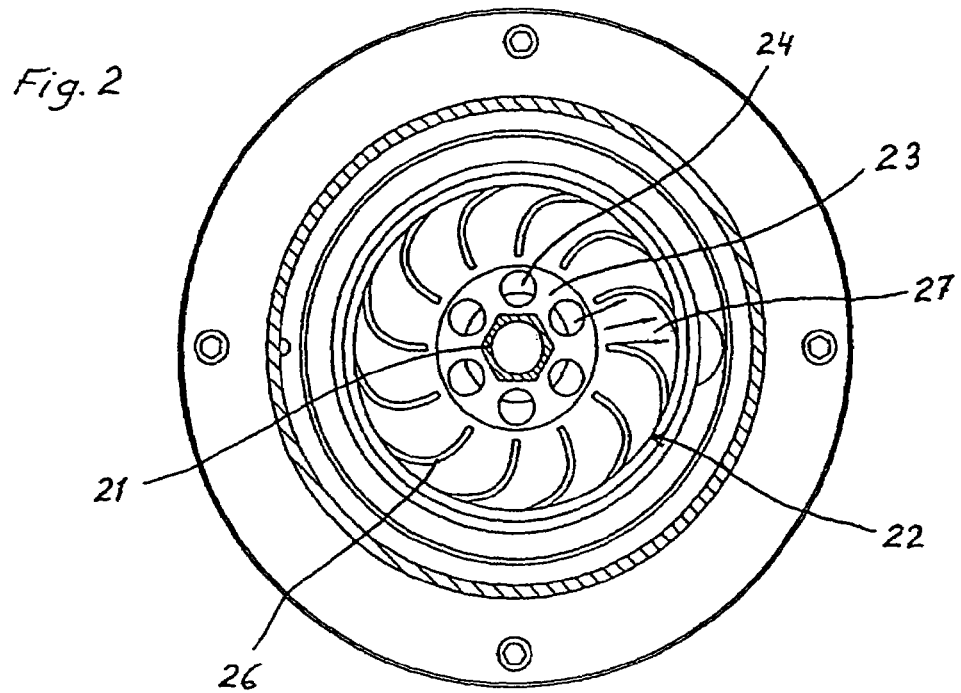
FIG. 2 illustrates a separation disc forming part of the centrifuge of FIG. 1.

FIG. 2 shows the side of a separation disc 22, that is facing upwardly in FIG. 1. This side is called the inside of the separation disc in the following, since it is facing in a direction inwardly towards the rotational axis of the rotor. As can be seen, the separation disc on its inside is provided with several elongated ribs 26 forming spacing members between this separation disc and the separation disc situated closest above in the disc stank. Between adjacent ribs 26 in an interspace between two separation discs there are formed flow passages 27 for gas to be cleaned. The ribs 26 extend, as shown in FIG. 2, along curved paths and form at least at the radially outer circumferencial portions of the discs an angle with the generatrices of the separation discs. As a consequence of the curved form of the ribs 26 also the flow passages 27 for the gas to be cleaned extend along paths which are curved in a corresponding way. The ribs 26 preferably extend across substantially the whole conical portion of each separation disc and end up in the vicinity of the radially outer surrounding edge of the separation disc.

An annular space 28 surrounds the rotor 8 in the housing 1 and constitutes part of the chamber 2.

The centrifugal separator described above is previously known and its function is extensively described in WO 01/36103. This function can be described briefly, as follows.

By means of the electrical motor 9 the rotor 8 is brought into rotation around the vertical axis R. Crankcase gas that has been produced by a combustion engine (not shown) and that is to be freed from oil particles and possibly also solid particles suspended therein, enters through the gas inlet 3 and is conducted upwardly in the central space 25 in the rotor 8. From there the crankcase gas is conducted into the interspaces between the conical portions of the separation discs 22, where it is entrained in the rotor rotation. As a consequence of the rotation the particles suspended in the gas are separated by being thrown by the centrifugal force against the insides of the separation discs, on which they then slide, or run in the form of a liquid, radially outwardly towards the surrounding edges of the separation discs. From these surrounding edges the particles in an agglomerated or coalesced form are thrown outwardly towards the surrounding wall of the stationary housing 1, along which they move downwardly and further out through the particle outlet 5.

The crankcase gas having been freed from particles flows out from the interspaces between the separation discs 22 to the annular space 28, which its leaves through the gas outlet 4.

The separation or cleaning efficiency of the centrifugal separator to a large extent depends on the rotational speed of the centrifugal rotor 8. The larger this speed is, the larger becomes the separation efficiency. By controlling of the rotational speed of the electrical motor 9 the cleaning efficiency of the centrifugal separator may be changed. Even in a non-rotating state the centrifugal rotor has a certain, although small, cleaning effect as a consequence of the crankcase gas being forced to change its direction of flow several times and to flow through narrow channels upon its passage through the centrifugal rotor.

By its construction the described centrifugal separator is adapted to suck impure crankcase gas in through its gas inlet 3 and to pump, by a certain overpressure, cleaned crankcase gas out through its gas outlet 4. The reason for this is that entering crankcase gas, that is not rotating, is conducted into the central inlet space 25 of the centrifugal rotor and is thereafter brought into rotation while it is cleaned on its way between the separation discs 22 out towards the annular space 28 around the rotor B in the housing 1. Crankcase gas in the surrounding space 28, thus, has a higher pressure than crankcase gas in the central space 25. It is important in this connection that the gas outlet 4 is situated at a larger distance from the rotational axis R of the centrifugal rotor than is the central gas inlet 3.

Figure 3:
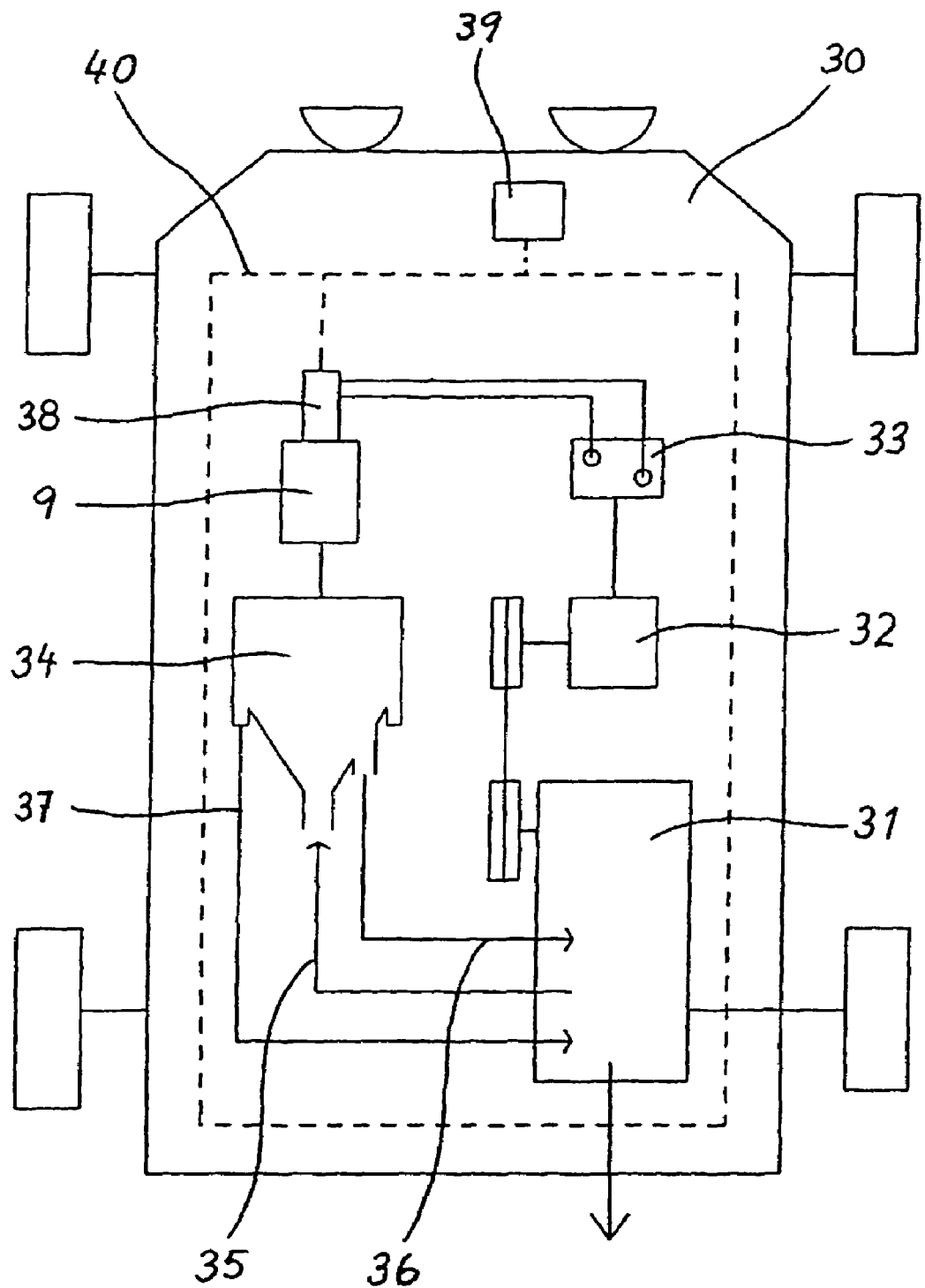
FIG. 3 schematically illustrates a vehicle incorporating the centrifugal separator of FIG. 1.

FIG. 3 illustrates a vehicle 30 and an internal combustion engine 31 supported thereby and arranged for the propelling of the vehicle. The combustion engine 31 is arranged also for operation of a current generator 32 that is connected with a current accumulator 33. The vehicle 30 is also equipped with a centrifugal separator 34 of the kind shown in FIGS. 1 and 2. A conduit 35 is arranged for conducting contaminated crankcase gas from the crankcase of the engine 31 to the gas inlet of the centrifugal separator, and conduits 36 and 37 are arranged for conducting cleaned crankcase gas and particles and oil separated from the crankcase gas, respectively, back to the combustion engine. The cleaned gas is conducted to the air intake of the combustion engine, and the separated particles are conducted together with the separated oil back to the so-called oil tray of the combustion engine. Alternatively, the cleaned gas could have been released to the surrounding atmosphere, while the separated particles and oil could have been collected in a separate vessel.

FIG. 3 also shows the electrical motor 9, which can be seen from FIG. 1 and which is arranged for driving the rotor 8 of the centrifugal separator. In connection to the electrical motor 9 there is arranged a control equipment 38 that is adapted to drive the electrical motor 9 at varying speeds. The control equipment 38 for current supply to itself and to the electrical motor is connected to the current generator 32 and to the current accumulator 33.

Further installed on the vehicle 30 is a computer network including a vehicle computer 39 and a so-called data-bus 40. A large number of sensors of various kinds are connected to the computer network for collection of data concerning different functions on the vehicle. Also said control equipment 38 is connected to this computer network, from which information can be collected for connection and disconnection of the electrical motor 9 or for change of the rotational speed of the electrical motor by means of the control equipment. Through the connection to the computer network information can also be given thereto of, for instance, the condition and operational status of the electrical motor and the centrifugal separator and the degree of contaminants in contaminated and cleaned crankcase gas.

The aforementioned motor 9 may be a direct-current motor or an alternating-current motor; either a synchronous motor or an asynchronous motor. Depending upon the type of the electrical motor the control equipment 38 may be designed in many different ways self-evident for a person skilled in the art of electrical motors.

If the control equipment 38 is connected to a computer network of the above mentioned kind, it does not have to be particularly complicated with a regard to its ability to treat signals coming from different sensors on the vehicle. In a case like that, namely, the aforementioned vehicle computer is equipped for a required such signal treatment and for production of a control signal for the driving of the electrical motor. The control equipment 38 in this case has to include a decoding means (interface), by means of which it can choose a correct signal from the computer network, after which the signal can be used for the controlling of the rotational speed of the electrical motor.

In the simplest case the control equipment may include an electrical relay, which is arranged for starting or stopping the operation of the electrical motor by means of a received control signal. A relay of this kind may have an input circuit influencable by data intended for controlling of the separation efficiency of the centrifugal separator 34, and an output circuit arranged for changing of the rotational speed of the electrical motor 9 depending upon these data.

However, the control equipment preferably includes a device for driving the electrical motor 9 at different speeds; either so that a limited number of speeds can be obtained or so that a continuous change of the motor speed can be performed. Different kinds of devices for speed regulation of motors (both direct-current and alternate-current motors) are well known and need no closer description here. For a direct-current motor a simple device for voltage control may be used. For an alternate-current motor various kinds of frequency control equipment may be used. Equipment of this kind is available for production of alternate current of variable frequency either by means of direct current or by means of alternate current.

Irrespective of whether the control equipment is of a sophisticated kind or not, it should be of a kind such that the operation of the electrical motor can be interrupted while the combustion engine is still in operation, e.g. at idle driving or upon operation of the combustion engine at a speed lower than a certain value. If desired, the operation of the electrical motor may be manually disconnectable and/or automatically connectable a certain period of time after the combustion engine has been started or after a certain rotational speed of the combustion engine has been reached. The electrical motor should be adapted for operation at a voltage of 48 volts or lower, e.g. 14, 28 or 42 volts.

As to the signal, by means of which the speed of the electrical motor should be controlled or adjusted, it may be a function of many different variable factors. Thus, one or more of the following factors may be included, for instance:

the gas pressure in the crankcase of the combustion engine the gas pressure in the air intake of the combustion engine the rotational speed of the combustion engine the load on the combustion engine the ambient air temperature the lubricating oil temperature of the combustion engine the total operational time of the combustion engine If there is no computer network of the kind described above, the rotational speed of the electrical motor may be adjusted or controlled by means of data transferred to the control equipment 38 directly from a sensor of some suitable kind. For instance, a sensor may be arranged in one way or another to sense the amount of crankcase gas being produced each moment by the combustion engine. A measurement of the amount of crankcase gas produced may be constituted by the pressure prevailing in the crankcase of the combustion engine or in a passage for crankcase gas between the crankcase and said centrifugal separator. Another measurement of the production of crankcase gas may be constituted by a value of the prevailing gas flow in said passage.

If the amount of produced crankcase gas is changed without the rotational speed of the centrifugal rotor 8 being changed, the pressure of the crankcase gas in the gas inlet 3 of the centrifugal separator is changed. Thus, if the production of crankcase gas decreases, the rotor 8 at a maintained rotational speed will more effectively than before suck crankcase gas from the combustion engine, whereby the pressure in the gas inlet 3 will drop. This means that also the gas pressure in the crankcase of the combustion engine 31 will drop. A pressure drop of this kind is avoided, however, by the previously described control equipment 38 causing the electrical motor 9 to reduce its rotational speed and thereby the rotational speed of the centrifugal rotor 8.

Even at a rotational speed reduced in this way the centrifugal rotor 8 will effectively clean the crankcase gas flowing therethrough. This is possible because at this stage a reduced amount of impure crankcase gas is produced by the combustion engine 31 per unit of time, and this crankcase gas therefore will be given an increased maintenance time in the centrifugal rotor on its way between the separation discs 22. Hereby, it will be given time to be effectively freed from oil and sot particles in spite of the centrifugal rotor 8 rotating at a reduced speed.

When the control equipment 38 gets a signal that the production of crankcase gas increases again, the rotational speed of the centrifugal rotor 8 will increase.

Figure 4:
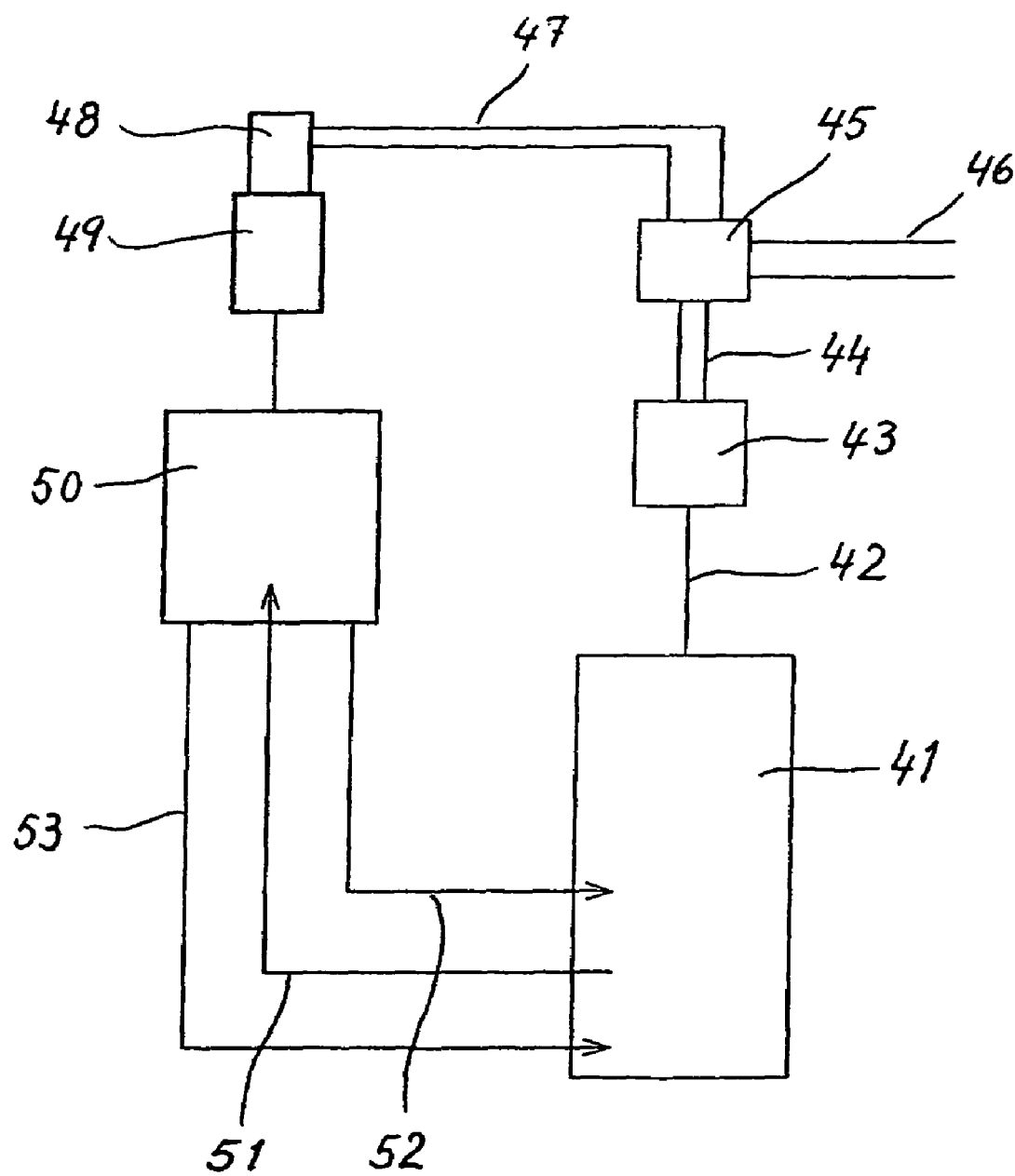
FIG. 4 schematically illustrates a plant for the production of electric equipment.

FIG. 4 shows schematically a plant for production of electric current. The plant may be stationary and land based or be mobile and be arranged for instance on board a vessel. The plant includes an internal combustion engine 41 arranged to drive through a transmission 42 an electrical generator 43. The electrical generator is arranged to deliver current through lines 44, an effect measuring device 45 and connections 46 to a current consumption plant (not shown).

The rotational speed of the combustion engine 41 may be varied but is preferably maintained substantially constant during operation of the plant. The electrical generator 43 is of a kind that may supply a varying effect at a substantially constant speed of the combustion engine. A variation of the effect output from the electrical generator 43 leads to a corresponding variation of the load by the electrical generator on the combustion engine 41, the rotational speed of which is maintained unchanged in spite of this.

When there is an effect output from the electrical generator 43, which is sensed by means of the effect measuring device 45, there is created a weak control current conducted through connections 47 to a frequency converter 48. The magnitude of the control current varies with the magnitude of the effect output, i.e. with the magnitude of the load on the combustion engine 41. The frequency converter is connected to an electrical motor 49 arranged to drive the centrifugal rotor of a centrifugal separator 50 at varying speed. The centrifugal separator 50 is of the same kind as the centrifugal separator shown in FIGS. 1 and 3.

Crankcase gas is conducted from the crankcase of the combustion engine 41 through a conduit 51 into the centrifugal separator 50, the centrifugal rotor 8 sucking crankcase gas to and in through its gas inlet (see FIG. 1). Cleaned crankcase gas is returned through a conduit 52 from the gas outlet 4 of the centrifugal separator to the combustion engine 41. Oil and some solid particles separated from the crankcase gas are returned through a conduit 53 from the particle outlet 5 of the centrifugal separator to the combustion engine 41.

When the combustion engine 41 is subjected to a relatively heavy load by the electrical generator 42, a relatively large amount of crankcase gas is generated in its crankcase per unit of time. The crankcase gas is cleaned in the centrifugal separator 50, the centrifugal rotor of which at this stage is kept in rotation by the motor 49 at a relatively high rotational speed. This rotational speed, that is determined by a certain value of the control signal in the connections 47 and of the frequency control signal from the frequency converter 48 to the motor 49, generated by the control current, is sufficiently high for the centrifugal separator to be able to receive and clean the whole amount of crankcase gas thus generated, while a gas pressure of an acceptable magnitude is maintained in the crankcase of the combustion engine.

At a different stage, when the combustion engine is subjected to a relatively small load by the electrical generator 43, a relatively small amount of crankcase gas is generated per unit of time in the crankcase of the combustion engine. Then there is created in the connections 47 a control signal of a different value than at the higher load on the combustion engine, and the frequency converter 48 is caused to reduce, in a corresponding degree, the rotational speed of the rotor of the centrifugal separator 50. Hereby, the suction effect of the centrifugal rotor in the crankcase gas conduit 51 is adapted to the amount of crankcase gas generated at this new stage in the crankcase, whereby is avoided that a heavy underpressure is created in the crankcase, so that a gas pressure within a desired pressure interval is still maintained in the crankcase.

The invention claimed is:

1. A method of cleaning crankcase gas generated during operation of an internal combustion engine in its crankcase, said method including the steps of:

using centrifugal separator that includes a centrifugal rotor arranged for rotation by means of a driving motor and arranged by its rotation to suck crankcase gas from the crankcase to the centrifugal separator, sensing a parameter, the magnitude of which is related to the amount of crankcase gas generated per unit of time in the crankcase, and changing the rotational speed of the centrifugal rotor in response to a sensed change of said parameter such that gas pressure in the crankcase is maintained at at least one of a predetermined value; and within a predetermined pressure interval, during the operation of the combustion engine.

2. A method according to claim 1, in which the rotational speed of the centrifugal rotor is changed from a first value to a second value, both larger than zero.

3. A method according to claim 1, in which the rotational speed of the centrifugal rotor is changed stepwise in more than two steps.

4. A method according to claim 1, in which the rotational speed of the centrifugal rotor is changed continuously.

5. A method according to claim 1, in which the rotational speed of the centrifugal rotor is changed in response to a sensed change of a flow of crankcase gas, that is generated as a consequence of the production of crankcase gas by the combustion engine.

6. A method according to claim 1, in which the rotational speed of the centrifugal rotor is changed in response to a sensed change of an over pressure of the crankcase gas, which comes up as a consequence of the production of crankcase gas by the combustion engine.

7. A method according to claim 1, in which a parameter varying with the load on the combustion engine is sensed.

8. A method according to claim 1, in which an electric driving motor is used for the rotation of the centrifugal rotor and a frequency converter is used for changing the rotational speed of the driving motor and, thereby, the speed of the centrifugal rotor.

9. A device for cleaning crankcase gas generated during operation of an internal combustion engine, said device including;

a centrifugal separator having a centrifugal rotor that is arranged for rotation by means of a driving motor and arranged by its rotation to suck crankcase gas from the crankcase to the centrifugal separator, the driving motor being arranged for rotation of the centrifugal rotor at different speeds, sensing means for sensing a parameter, the magnitude of which is related to the amount of crankcase gas generated per unit of time in the crankcase, said sensing means being operatively connected with the driving motor; and the driving motor being arranged to change the rotational speed of the centrifugal rotor in response to a sensed change of said parameter in a way such that the gas pressure in the crankcase is maintained at at least one of a predetermined value, and within a predetermined pressure interval, during the operation of the combustion engine.

10. A device according to claim 9, in which the driving motor is electric and a frequency converter is connected between the sensing means and the driving motor.

11. A device according to claim 9, in which the sensing means is arranged to sense a parameter that is related to the load to which the combustion engine is subjected during its operation.

* * * * *